(12) United States Patent
Steckhan et al.

(10) Patent No.: US 7,481,152 B2
(45) Date of Patent: Jan. 27, 2009

(54) BREWING UNIT FOR A COFFEE MACHINE

(75) Inventors: Markus Steckhan, Muhlheim (DE); Dietmar Becker, Radevormwald (DE)

(73) Assignee: WIK Far East Ltd., Hong Kong (CN)

( * ) Notice: Subject to any disclaimer, the term of this patent is extended or adjusted under 35 U.S.C. 154(b) by 14 days.

(21) Appl. No.: 11/563,883

(22) Filed: Nov. 28, 2006

(65) Prior Publication Data

US 2007/0119310 A1 May 31, 2007

(30) Foreign Application Priority Data

Nov. 29, 2005 (DE) .................. 20 2005 018 607 U

(51) Int. Cl.
*A47J 31/00* (2006.01)
(52) U.S. Cl. .................. 99/287; 99/289 R; 99/289 P
(58) Field of Classification Search .................. 99/495, 99/275, 279–323, 348, 485–487, 467–473
See application file for complete search history.

(56) References Cited

U.S. PATENT DOCUMENTS 4,667,585 A * 5/1987 Harashima et al. ......... 99/289 R
5,402,706 A * 4/1995 Locati .......................... 99/287

FOREIGN PATENT DOCUMENTS

| EP | 0608805 | 8/1994 |
|---|---|---|
| EP | 1260166 | 11/2001 |
| EP | 01552777 | 7/2005 |
| GB | 2162419 | 2/1986 |

OTHER PUBLICATIONS

Search report from corresponding European application dated Feb. 1, 2007.

* cited by examiner

*Primary Examiner*—Timothy F. Simone
(74) *Attorney, Agent, or Firm*—Margaret Polson

(57) ABSTRACT

A brewing unit 1 for a coffee machine comprises a brewing cylinder 2 and a piston 5, 13, wherein the brewing cylinder 2 and the piston 5, 13 are movable relative to one another in the axial direction. An activatable seal 12, 18 or seal assembly is provided to seal the piston 5, 13 against the inner wall 3, 15 of the brewing cylinder 2. The seal 12, 18 is activated by an axial movement of piston 5, 13 with respect to the brewing cylinder 2. Under compression when activated, to form a seal between piston 5, 13 and brewing cylinder inner wall 3, 15, and which seal 12, 18 or seal assembly. When not activated, the seal 12, 19 is either not at all, only under low compression contact with the element.

6 Claims, 1 Drawing Sheet

BREWING UNIT FOR A COFFEE MACHINE

CROSS REFERENCE APPLICATIONS

This application claims priority from German application no. 20 2005 018 607.4 filed Nov. 29, 2005.

BACKGROUND

The invention relates to a brewing unit for a coffee machine comprising a brewing cylinder and a piston, the brewing cylinder and the piston being movable in the axial direction relative to one another.

In fully automatic coffee machines the preparation of coffee is done in portions. This requires a brewing unit in which the ground coffee powder is compressed and subsequently brewed. Such brewing units have a brewing chamber formed by a brewing cylinder which is sealed by two pistons at its open ends. At least one of the two pistons and the brewing cylinder are movable relative to one another. The movement of these elements toward one another compresses the coffee powder introduced via a duct into the brewing chamber between the two pistons, and subsequently ejects the leached-out coffee powder. One of the two pistons, has a conduit to supply the hot water required for the brewing process, while an outlet conduit is connected to the other piston. The outlet conduit, in turn, is connected to a coffee delivery conduit to fill the brewed coffee into a drinking vessel, for example a cup. Different methods are known for conceptualizing the necessary movement with respect to one another of the individual elements of a brewing unit.

For example, EP 0 659 377 A1 describes a driving system which moves the brewing chamber with respect to the two pistons. To compress the coffee power, one piston is entrained by the brewing chamber, while the other piston serves as an abutment. Consequently in this brewing unit only two elements are movable with respect to one another, namely the brewing cylinder and one of the two pistons. Also known are brewing units where both pistons and the brewing cylinder are all movable relative to one another and are moved with one another or also toward one another in the course of a brewing cycle.

In all previously known brewing units, each of the pistons includes an encircling sealing ring for sealing off the piston against the inner wall of the brewing cylinder. The sealing rings are in contact with inner wall of the brewing cylinder with sufficient compression such that the necessary seal of the brewing chamber is ensured, even at the higher pressures of the brewing chamber when brewing espresso. In brewing units where coffee is prepared under increased pressure, the piston seal must be in contact with the inner wall of the brewing cylinder under a correspondingly high compression. However, with increased compression the frictional resistance naturally increases during movement of the piston with respect to the brewing cylinder. Consequently, when such sealing rings are employed the motor drive of the movable elements of the brewing unit must be correspondingly strong.

The brewing cylinder comprises a filling duct or a filling opening to allow ground coffee powder to be introduced into the brewing chamber formed by a section of the brewing cylinder and the two pistons. The coffee is brewed in a section of the brewing cylinder spaced apart from the filling opening. The section is formed by the two pistons in the brewing position of the brewing unit. In order to transport the coffee powder into this section of the brewing cylinder, at least one of the two pistons is moved with respect to the brewing cylinder. During this movement the sealing ring of the piston is also guided past the filling opening, so that the section of the sealing ring extending over the opening relaxes in it due to its material elasticity and, upon reaching the edge of the filling opening, in turn, is compressed by the inner wall of the brewing cylinder. Therefore, the sealing ring is exposed to wear at this site. To counteract such wear, EP 0 484 277 B1 proposes to dispose the piston which is moved with respect to the brewing cylinder in a sleeve. The sleeve is transported past the filling opening together with the piston and only after the transport is the piston extended out of the sleeve to compress the coffee powder. While this measure counteracts the one-sided wear of the sealing ring when guiding it past the filling opening, the sealing ring is subjected to uniform wear and tear with respect to its circumference in the process of the retracting and extending from the sleeve since the piston with the sealing ring must be extended out of the sleeve and retracted again.

The foregoing example of the related art and limitations related therewith are intended to be illustrative and not exclusive. Other limitations of the related art will become apparent to those of skill in the art upon a reading of the specification and a study of the drawings.

Building on this discussed prior art, the invention therefore has as its aim to propose a brewing unit for a coffee machine, in which the problems discussed in connection with the addressed prior art with respect to the necessary tightness of the brewing chamber during the brewing, on the one hand, and the wear of the piston seal, on the other hand, is solved.

SUMMARY

According to the invention this aim is achieved through a brewing unit in which the piston is sealed against the inner wall of the brewing cylinder by an activatable seal or seal assembly. The seal is activated through an axial movement of the piston, or of a portion thereof, with respect to the brewing cylinder. The seal is compressed when activated, providing sealing between the piston and brewing cylinder inner wall. When not activated the seal or seal assembly is either not in contact with the element moved relative to the seal or to the seal assembly, or is only under low pressure.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

This brewing unit has a seal or a seal assembly which can be activated. The seal or seal assembly is in its activated state when the individual elements of the brewing unit are in their brewing position with respect to one another. In that position, the highest pressure is obtained the brewing chamber and the sealing function of the seal or of the seal assembly is required. When the individual elements of the brewing unit are not in the brewing position, the requirements for the sealing of the interior volume of the brewing chamber or of the brewing cylinder are lower and the interior volume of the brewing chamber is un-pressurized. Therefore, the seal or the seal assembly is not activated during these sections of the brewing cycle. The seal or the seal assembly can be associated with the piston and/or with the brewing cylinder, and it is advisable to associate the seal or the seal assembly with only one of the two elements.

Depending on their conceptualization, the seal or the seal assembly is either not in contact with, or only under low contact with, the element moved relative to the seal or to the seal assembly when not activated. The seal or the seal assembly can be either supported by the piston or by the brewing cylinder, and the element not supporting the seal or the seal assembly is the element moved relative to the seal or the seal assembly. In the case of a seal assembly, there is also feasible that it is comprised of several elements which are partially supported by the piston and partially by the brewing cylinder.

The seal or seal assembly is activated by a relative axial movement between the brewing cylinder and the piston or a portion of the piston. The seal or seal assembly is only activated when the elements of the brewing unit are located in their brewing position or are being moved into the brewing position. An activation of the seal or seal assembly by a relative axial movement between brewing cylinder and piston, or a portion of the same, causes the compression exerted by the increasing internal pressure within the brewing chamber onto the seal or the seal assembly to increase, since with increasing internal pressure the piston or the piston part tends to yield in the axial direction and to act against the seal or the seal assembly, whereby the contact pressure of the same onto the sealing face is increased.

As a rule, an O-ring is utilized as the seal for sealing off the piston against the inner wall of the brewing chamber. A seal assembly typically comprises several sealing rings. Due to the activatability, it is also possible to use several sealing rings acting in parallel without increasing the friction between the piston and the brewing chamber during a relative movement. A seal assembly may also be comprised of two cooperating sealing ring elements. For example a sealing ring can be associated each with the piston and with the brewing cylinder.

According to an embodiment example, the piston supports a sealing ring on the backside of its piston bottom. The activation of seal happens on an inwardly projecting encircling flange-like shoulder on the rearward end of the brewing cylinder. The sealing of the brewing chamber in this embodiment example consequently does not take place in the radial direction with respect to the inner wall of the brewing cylinder, but rather in the axial direction with respect to the shoulder as a part of the brewing cylinder. Such an implementation is feasible if the brewing cylinder is moved as a driving element with respect to the piston and, as a consequence of the described staying arrangement, moves the piston into its brewing position. The compression necessary for the activation of the seal is generated by the pressure exerted by the shoulder onto the piston. The piston, with its piston face directed toward the other piston, is stayed during the brewing process on the coffee powder compressed in the brewing chamber.

According to a further embodiment, the piston is built of two parts, a piston bottom part and a connection piston part, both of which can be moved toward one another in the axial direction. The piston bottom part and the connection piston part each have an annular groove delimitation face for forming an encircling annular groove, in which a sealing ring is disposed. The piston bottom part is guided loosely in or on the connection piston part such that, upon pressurization, the piston bottom part tends to be moved toward the stationary connection piston part such that the sealing ring is increasingly placed under higher compression when compacting the ground coffee powder in the brewing position of the brewing unit, and also due to the hot water supply and the internal pressure generated in the brewing chamber. The sealing ring has radially inwardly directed side, which rests in the bottom of the annular groove of this piston such that during this compression the sealing ring can only yield outwardly in the radial direction toward the inner wall of the brewing cylinder. With increasing internal pressure in the brewing chamber the sealing ring is under greater compression and is subsequently pressed onto the inside of the brewing cylinder.

In its non-activated state, the seal or the seal assembly is in contact with the inner wall of the brewing cylinder under low compression at most, so that the piston can be moved with respect to the brewing cylinder with relatively low effort. In particular, the piston can be moved without significant wear occurring on the sealing ring, even if the seal is moved past a coffee filling opening of the brewing cylinder in the course of a brewing cycle. The same applies to those pistons which are moved out of the brewing cylinder and subsequently retracted again into the brewing cylinder in the course of a brewing cycle of the brewing unit, for example in order to eject the leached-out coffee after completing a brewing process.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

A coffee machine, not further depicted here, has a brewing unit 1. The brewing unit 1 is only represented in the Figures with the elements essential to the description of the invention. The driving mechanism, the hot water supply and the coffee delivery, in addition to other elements, are not shown. The brewing unit 1 comprises a brewing cylinder 2 with a cylindrical inner shell surface 3. In a manner not further shown, the brewing cylinder 2 is supported such that it is longitudinally and axially movable on guide rods and is driven by an electric motor by means of a spindle drive, as is indicated by double arrow X in FIG. 1. The brewing cylinder 2 includes a filling opening 4 for supplying ground coffee powder. The filling opening 4 is located on the top side of the brewing cylinder 2, such that ground coffee powder can fall into the brewing cylinder 2 through the force of gravity.

Figure 1:
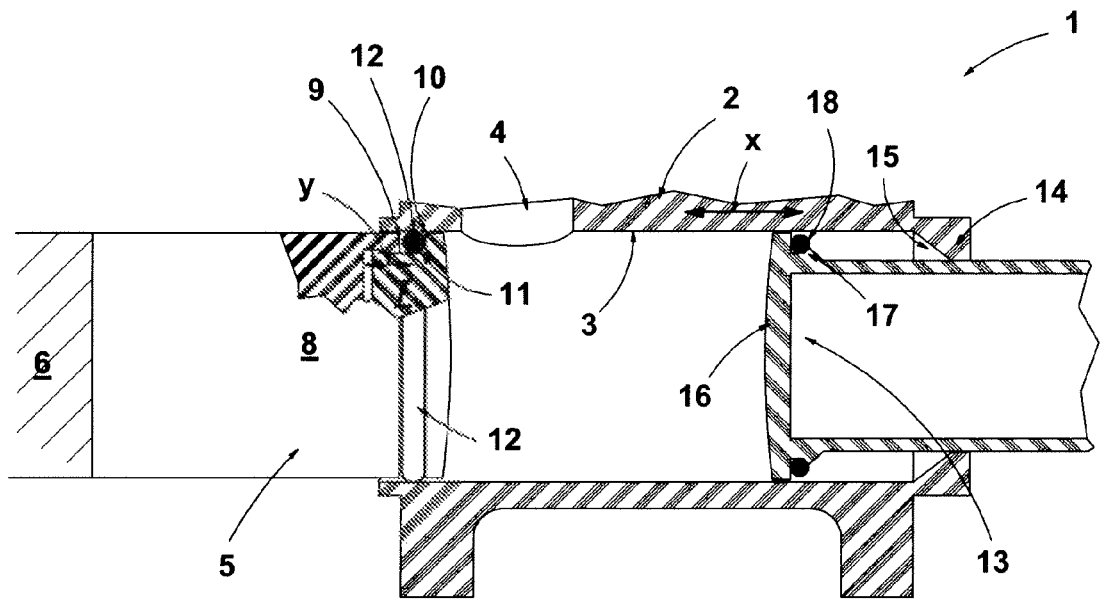
FIG. 1 is a schematic cross section through a brewing unit of a coffee machine in a first position of its movable elements within a brewing cycle.
Figure 2:
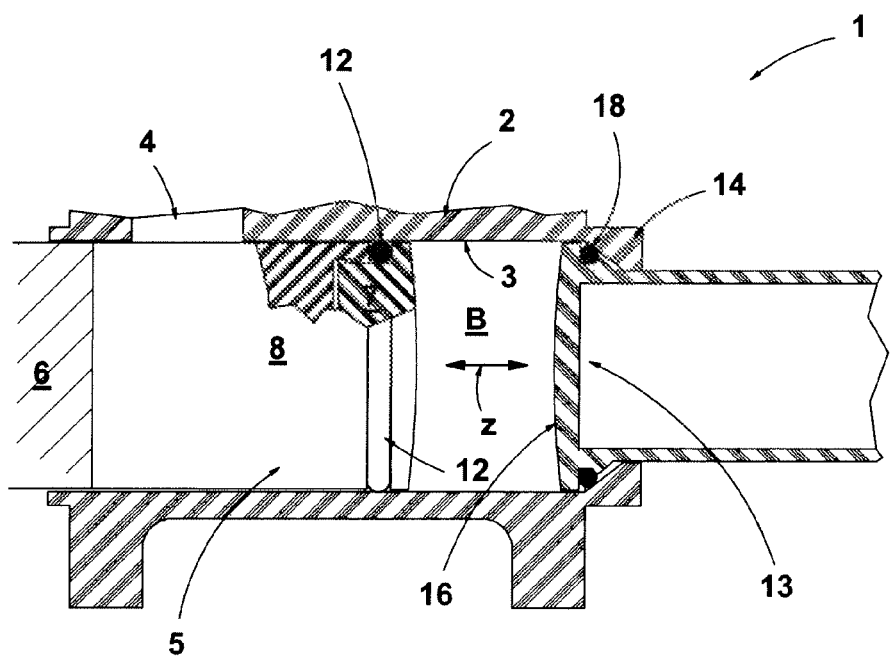
FIG. 2 is the brewing unit of FIG. 1 in the brewing position of the depicted movable elements.

Associated with the brewing unit 1 is a stationary first piston 5 to delimit a brewing chamber B on its left side, as shown in FIG. 1 (cf. FIG. 2). The stationary piston 5 has a filter plate, not shown, as a piston bottom directed toward the brewing chamber B, as well as a coffee outlet conduit not further shown. The piston 5 is firmly secured on an abutment 6, through which the axial movement of the piston 5 in the direction toward the abutment 6 is blocked. The piston 5 of the depicted embodiment example has a piston bottom part 7 and a connection piston part 8. The connection piston part 8 is firmly secured on the abutment 6. The piston bottom part 7 opposing the connection piston part 8 is movable in the axial direction, as is indicated by the double arrow Y. The two parts 7, 8 are captivatingly connected with one another. An annular groove is formed by the backside of the piston bottom part 7 and the side facing toward the brewing chamber B of the connection piston part 8. The encircling groove is bordered by the annular groove delimitation faces 9, 10 and in the radial direction toward the longitudinal axis of the piston 5 by a groove bottom 11 of the piston bottom part 7. In this groove is disposed a sealing ring 12. The sealing ring rests with its inner side in contact on the groove bottom 11. In the position of the piston 5 shown in FIG. 1, the sealing ring rests virtually without compression on the inner wall 3 of the brewing cylinder 2. This has the advantage that when the piston 5 is moved out of the brewing cylinder 2, which is necessary in order to eject the compacted coffee ground at the completion of a brewing cycle, wear of the sealing ring 12 is avoided during the repeated retraction of the piston 5 into the brewing cylinder 2.

Also associated with the brewing unit 1 is a movable second piston 13. The hot water necessary for brewing the coffee is introduced in the brewing position of the brewing unit through the piston 13, in a manner not further shown in the Figures. The movable piston 13 also serves to compress the coffee filled into the brewing cylinder 2 through the filling opening 4. The piston 13 is not actively driven in the depicted embodiment. An inwardly projecting shoulder or flange-like annular section 14 of the brewing cylinder 2 serves to move the piston 13. The face 15 directed toward the interior of the brewing cylinder 2 of annular section 14 has a conical taper. When the brewing cylinder 2 is moved into its brewing position (movement toward the left in FIGS. 1 and 2), this face 15 forms the set face for the entrainment of piston 13.

On the backside of its piston bottom 16 the movable piston 13 has a sealing ring 18 located on a shoulder 17. In the position shown in FIG. 1, the sealing ring 18 is not in contact with either the cylindrical portion of the inner wall 3 of brewing cylinder 2 or the set face 15. Consequently, brewing cylinder 2 is freely movable in the axial direction with respect to piston 13.

After filling ground coffee powder the interior of the brewing cylinder 2 through the filling opening 4, the brewing unit 1 is brought into its brewing position by moving the brewing cylinder 2. The brewing cylinder 2 moves toward the piston 5, such that the latter pushes the filled-in coffee powder into the brewing cylinder 2 until the brewing cylinder 2 has been moved into its end position (cf. FIG. 2). The movable piston 13 is entrained with the brewing cylinder 2, since after a first movement section of the brewing cylinder 2 the set face 15 contacts the sealing ring 18 of piston 13. This occurs as the diameter of the sealing ring 18 and of the piston bottom 16 is greater than the inner width of the rearward opening of the brewing cylinder 2 defined by the annular section 14.

FIG. 2 depicts the brewing unit 1 with its movable elements in the brewing position. Through the two pistons 5, 13 a section of the brewing cylinder 2 is formed, in which the previously filled in coffee powder is compacted. This chamber formed by the two pistons 5, 13 and a section of the brewing cylinder 2 acts as the brewing chamber B. Due to the pressure exerted onto the piston 13 and the coffee powder located between the two pistons 5, 13, the particular piston seals - the sealing rings 12, 18 - are brought under compression and consequently activated in order to seal off the brewing chamber B against the inner wall 3 or 15 of the brewing cylinder 2. This axial pressure acting onto the particular pistons 5, 13 is indicated by the double arrow Z within the brewing chamber B in FIG. 2. The piston bottom part 7 is moved in the axial direction toward the piston connection part 8 activates sealing ring 12 of piston 5. Piston bottom 16 moving toward the set face 15 activates the sealing function of sealing ring 18 of piston 13. The hot water supplied for brewing the coffee increases the internal pressure within brewing chamber B and therefore the compression pressure acting onto the sealing rings 12 18 also increases. With the increasing internal pressure in the brewing chamber, the sealing rings 12, 18 form a tighter seal according to the requirements. After the coffee has been brewed, the brewing chamber becomes non-pressurized again, and the two sealing rings 12, 18 are again in their non-activated state, shown in FIG. 1. This means that the brewing cylinder 2 can be moved with respect to the two pistons 5, 13 virtually free of friction for the ejection of the leached-out coffee cake. The annular gap extending in the radial direction between the piston bottom 16 of piston 13 toward the inner wall 3 of brewing cylinder 2 is formed with only a narrow gap width. This is preferably smaller than the particle size of the coffee powder to be filled into the brewing chamber B. The same applies also to a gap possibly remaining between the sealing ring 12 of piston 5 and the inner wall 3 of the brewing cylinder 2.

The brewing unit has been described in conjunction with a coffee machine comprising such brewing unit. The described activatable piston sealing can also be employed with the same advantages for brewing units of other beverage preparation machines, in which a brewing cylinder and a piston, moved relative to one another, are used. In the brewing unit described in the Figures two different embodiment examples of the claimed piston sealing are described. It is understood that both described embodiment examples can also be employed independently of one another. This is the case in brewing units, in which only one sealing is implemented as an activatable sealing.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true sprit and scope. Each apparatus embodiment described herein has numerous equivalents.

LIST OF REFERENCE SYMBOLS

1 Brewing unit
2 Brewing cylinder
3 Inner wall
4 Filling opening
5 Stationary piston
6 Abutment
7 Piston bottom part
8 Connection piston part
9 Annular groove delimitation face
10 Annular groove delimitation face
11 Groove bottom
12 Sealing ring
13 Movable piston
14 Annular section
15 Face
16 Piston bottom
17 Shoulder
18 Sealing ring
21 B Brewing chamber
X, Y, Z movement arrows

The invention claimed is:

1. A brewing unit for a coffee machine comprising:

a brewing cylinder and at least one piston wherein the brewing cylinder and the piston are movable relative to one another in an axial direction;

an activatable seal assembly for sealing the piston against an inner wall of the brewing cylinder;

said seal assembly being activated by being placed in compression by an axial movement of at least a part of a piston with respect to the brewing cylinder to form a seal between piston and brewing cylinder inner wall;

said seal assembly when not activated being in at most minimal contact with the inner wall being moved relative to the seal assembly;

wherein in a brewing position of pistons and brewing cylinder, a first piston is held in place by a backside of a first piston bottom pressing on an inwardly projecting annular section of the brewing cylinder with the sealing assembly located between the first piston bottom and the annular section; and wherein the sealing assembly moves at most only minimally in the axial direction relative to a support for sealing assembly.

2. The brewing unit as claimed in claim 1, wherein the brewing cylinder is driven by a motor and the piston is moved by a movement of the brewing cylinder.

3. The brewing unit as claimed in claim 1 or 2, wherein the first piston supports the sealing assembly.

4. The brewing unit as claimed in claim 3, wherein the inwardly projecting annular section of the brewing cylinder is inclined facing away from the backside of the first piston in the direction toward the longitudinal axis of the brewing chamber.

5. The brewing unit as claimed in one of claims 1, 2, or 4 further comprising a coffee machine.

6. The brewing unit as claimed in of one of claims 1, 2, or 4 wherein the sealing assembly is a sealing ring.

* * * * *